United States Patent [19]

Davis

[11] Patent Number: 4,732,925

[45] Date of Patent: Mar. 22, 1988

[54] VULCANIZABLE ELASTOMERIC ROOF SHEETING AND FLASHING COMPOSITION

[75] Inventor: James A. Davis, Uniontown, Ohio

[73] Assignee: The Firestone Tire & Rubber Company, Akron, Ohio

[21] Appl. No.: 884,153

[22] Filed: Jul. 10, 1986

[51] Int. Cl.⁴ .................................................. C08K 3/04
[52] U.S. Cl. ..................... 524/426; 524/425; 524/427; 524/451; 524/456; 524/496; 524/554
[58] Field of Search ............... 524/451, 425, 456, 496, 524/426, 427

[56] References Cited

FOREIGN PATENT DOCUMENTS 1119738 7/1968 United Kingdom .

Primary Examiner—Herbert J. Lilling
Attorney, Agent, or Firm—Frank J. Troy, Sr.

[57] ABSTRACT

Vulcanizable elastomeric roof sheeting or flashing compositions comprising a vulcanizable elastomer, a metallurgical carbon and a vulcanizing agent are provided. The compositions may additionally contain conventional thermal or furnace type carbon blacks and other conventional rubber chemical additives. The compositions while lower in cost than elastomeric roof sheeting or flashing compositions containing conventional carbon blacks exhibit comparable physical properties in most instances.

12 Claims, No Drawings

VULCANIZABLE ELASTOMERIC ROOF SHEETING AND FLASHING COMPOSITION

BACKGROUND OF THE INVENTION

The invention relates to vulcanizable elastomeric roof sheeting or flashing compositions containing vulcanizable elastomers and metallurgical carbon. More particularly, the invention relates to vulcanizable elastomeric roof sheeting or flashing compositions which comprise a vulcanizable elastomer, a metallurgical carbon and a vulcanizing agent.

Elastomeric roof sheeting, also referred to as roofing membranes, are known for use as roofing materials, particularly as single ply rubber roofing membranes for industrial and commercial flat roofs. These membranes are generally applied to the roof surface in the vulcanized or cured state. Elastomers which are most commonly employed in forming the membranes are EPDM, butyl and neoprene but chlorosulfonated polyethylene and chlorinated polyethylene are occasionally utilized in some special applications. The roofing membranes are generally prepared by calendering the unvulcanized elastomer compounds into sheets of various widths, lengths and thickness and then vulcanizing the sheets usually employing hot air or steam autoclave, although continuous vulcanization is reported to be beyond the research phase.

Elastomeric roof flashing is also known for its use on roofs, especially flat roofs. This material is employed to seal around elements that extend or protrude from the roof surface such as sky lights, air conditioning units, vent pipes and the like. The elastomeric flashing compound is often formulated using the same elastomers as are employed in the roof sheeting compound but a special curing package is included in the compound which allows it to cure over an extended period of time under ambient temperature conditions. Thus, the roof flashing is applied to the roof surface in the unvulcanized state and cures in-situ on the roof.

Vulcanizable elastomeric EPDM and butyl compositions containing conventional carbon blacks and vulcanizing agents have long been known in the tire and industrial rubber products arts. More recently, vulcanizable EPDM and/or butyl rubber compositions have been proposed for use as roof sheeting and flashing compositions as illustrated by U.S. Pat. Nos. 4,461,875 and 4,514,442.

The aforementioned patents relate to roof sheeting and flashing compositions which comprise an elastomer selected from the group consisting of EPDM, butyl rubber and an EPDM-butyl rubber mixture; from 0.1 to 3.0 parts of a compound having the structural formula $[(CH_2)_nNCS]_2S_6$ wherein n is 4 or 5; and 0 to 5.0 parts of a sulfur donor curative. The patents further disclose that the compositions may additionally contain one or more vulcanizing accelerators, processing oils, plasticizers and fillers and reinforcing agents. Among the fillers and reinforcing agents which are said to be especially useful are carbon black, silicates, talc, calcium carbonate and the like.

Elastomeric EPDM roofing compositions, especially compositions for roof sheeting or membranes, have rapidly gained acceptance in the commercial roofing industry due to the outstanding weathering resistance and flexibility of EPDM elastomers. However, the increased acceptance of elastomeric EPDM roofing compositions by the commercial roofing industry has been accompanied by increased cost competition. Accordingly, those active in the elastomeric EPDM roofing composition field are constantly striving to develop lower cost compositions. However, it has proven difficult to develop lower cost EPDM roofing compositions which do not involve some sacrifice in the important properties of the composition such as weathering resistance, flexibility and tear resistance. Thus, the development of low cost elastomeric roofing compositions having desirable physical properties is an important objective.

SUMMARY OF THE INVENTION

In accordance with the present invention, vulcanizable elastomeric roof sheeting or flashing compositions of relatively low cost are provided. Such compositions comprise: (a) 100 parts by weight of a vulcanizable elastomer selected from the group consisting of EPDM, butyl, neoprene, chlorosulfonated polyethylene and chlorinated polyethylene; (b) from about 6.0 to about 55.0 parts by weight of a metallurgical carbon and (c) from about 0.5 to about 6.0 parts by weight of a vulcanizing agent.

The aforementioned compositions may additionally contain conventional carbon blacks and other conventional rubber additives. Especially useful compositions contain mixtures of conventional thermal or furnace type carbon blacks and metallurgical carbon. The compositions while lower in cost than elastomeric roof sheeting or flashing compositions containing conventional carbon blacks have basically comparable physical properties.

DETAILED DESCRIPTION OF THE INVENTION

As indicated above, the vulcanizable elastomer component of the compositions of the invention is selected from the group consisting of EPDM, butyl, neoprene, chlorosulfonated polyethylene and chlorinated polyethylene. A preferred vulcanizable elastomer is EPDM.

The term "EPDM" as used throughout the specification and claims is used in the sense of its definition as found in ASTM-D-1418-64 and is intended to mean a terpolymer of ethylene, propylene and a diene monomer. Illustrative methods for preparing such terpolymers are found in U.S. Pat. No. 3,280,082 and British patent No. 1,030,289, the disclosures of which are incorporated herein by reference. The preferred terpolymers contain from about 40 to about 80 weight percent ethylene and from about 1 to about 10 weight percent of the diene with the balance of the terpolymer being propylene.

The diene monomer utilized in forming the EPDM terpolymer is preferably a non-conjugated diene. Illustrative examples of non-conjugated dienes which may be employed are dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene and the like. A typical EPDM is Vistalon 2504 (Exxon Chemicals America Co.), a terpolymer having a Mooney Viscosity (ML, 1+8, 100° C.) of about 40 and having 50 weight percent of ethylene, 45 weight percent of propylene and 5.0 weight percent of 5-ethylidene-2-norbornene with an Mn as measured by GPC of about 47,000 and an Mw as measured by GPC of about 174,000. Another typical EPDM is Nordel 1070 an ethylene/propylene/1,4-hexadiene terpolymer having an Mn of about 87,000 and an Mw of about 188,000 available from duPont.

The metallurgical carbon component of the compositions of the invention is a high purity metallurgical carbon which has been superheated to drive off any organic materials and then screened to 325 mesh fineness to insure easy dispersion in rubber formulations. The metallurgical carbon has a particle size distribution as follows: 97% less than 5 microns, preferably 50% less than 1.5 microns and most preferably 30% less than 1 micron. A preferred material of this type is available from D. J. Enterprises, Cleveland, Ohio, under the designation '"C" Grade Carbon—325 Mesh' and has the following chemical analysis:

carbon, fixed: 75%
ash content: 23%
sulfur content: 1%
moisture content: 1.25%
specific gravity at 25° C.: 1.75
ignition temperature: (approx) 1000° F.
bulk density: 25 lbs./ft$^3$ Amounts of metallurgical carbon employed in the compositions may range from about 6.0 to about 55.0 parts by weight with preferred amounts ranging from about 6.0 to about 32.0 parts by weight. Equivalent Shore A hardness of the composition was maintained by replacing each phr of conventional GPF carbon black with 1.25 phr of metallurgical carbon.

In addition to the metallurgical carbon, the compositions may and preferably will also contain conventional carbon blacks of the furnace or thermal types. In such cases, the compositions may contain from about 6 to about 55.0 parts by weight of metallurgical carbon and from about 78.0 to about 128.0 parts by weight of conventional carbon black.

As indicated, the compositions of the invention also contain vulcanizing agents. It will be evident that the specific vulcanizing agents employed in the compositions are dependent upon the particular elastomer which is utilized in the composition.

Vulcanizing agents which may be employed in EPDM and/or butyl elastomer based compositions include sulfur and sulfur donor compounds. Mixtures of sulfur and sulfur donor vulcanizing agents may also be utilized and such mixtures are in many instances preferred. Sulfur donor vulcanizing agents which may be employed in the compositions include thiuram polysulfides such as tetramethylthiuram disulfide, tetraethylthiuram disulfide, diisopropylthiuram disulfide, tetrabutylthiuram disulfide, dipentamethylenethiuram tetrasulfide, dipentamethylenethiuram hexasulfide, dicyclohexamethylenethiuram disulfide, phenylethylthiuram disulfide and the like; and salts of dialkyldithiocarbamates such as zinc dibutyldithiocarbamate, zinc dimethyldithiocarbamate, zinc diethyldithiocarbamate, bismuth dimethyldithiocarbamate, nickel dibutyldithiocarbamate, copper dimethyldithiocarbamate, selenium diethyldithiocarbamate, lead dimethyldithiocarbamate, tellurium dimethyldithiocarbamate, tellurium diethyldithiocarbamate, cadmium diethyldithiocarbamate and the like. It should be appreciated that this list is not exclusive and other sulfur donor compounds known in the art may be utilized.

Amounts of sulfur, sulfur donor compounds or mixtures thereof employed in the EPDM and/or butyl elastomer compositions may range from about 0.5 to about 6.0 parts by weight with preferred amounts ranging from 1.0 to 4.0 parts by weight.

In addition to the sulfur or sulfur donor vulcanizing agents, one or more vulcanizing accelerators may be included in the EPDM and/or butyl elastomer compositions. Vulcanizing accelerators which may be employed include thioureas such as ethylene thiourea, N,N'-dibutylthiourea, N,N'-diethylthiourea and the like; thiuram monosulfides such as tetramethylthiuram monosulfide, tetraethylthiuram monosulfide, tetrabutylthiuram monosulfide and the like; benzothiazole sulfenamides such as N-oxydiethylene benzothiazole-2-sulfenamide, N-cyclohexyl benzothiazole-2-sulfenamide, N,N-diisopropyl benzothiazole-2-sulfenamide, N-tert-butyl benzothiazole-2-sulfenamide and the like; 2-mercaptoimidazoline; N,N'-diphenyl-guanidine; N,N'-di-(2-methylphenyl) guanidine; 2-mercaptobenzothiazole, 2-(morpholinodithio)benzothiazole disulfide and zinc 2-mercaptobenzothiazole.

Specific vulcanizing systems which are employed in the EPDM or butyl compositions are dependent upon whether the composition is to be used as a roofing membrane or roof flashing composition. In addition, such systems will depend on the desired vulcanization conditions i.e., vulcanization times, temperatures, etc.

As indicated above, elastomeric roof sheeting or membrane is vulcanized using heat prior to application to the roof surface. Thus, vulcanizing systems for EPDM or butyl elastomer compositions used as roofing membranes may be virtually any of those known in the art to be effective in the heat curing of EPDM or butyl rubber compositions. Suitable vulcanizing systems for EPDM or butyl roofing membranes may readily be determined without undue experimentation by appropriate selection from the vulcanizing agents and accelerators listed above. A typical vulcanizing system for EPDM roofing membrane compositions is illustrated in the examples below and consists of sulfur, tetramethylthiuram disulfide and N-tertiary-butyl benzothiazole-2-sulfenamide.

As also mentioned above, elastomeric roof flashing which is applied to the roof surface in an unvulcanized state contains a special cure package which allows it to cure in-situ on the roof. Thus, EPDM or butyl compositions which are used as flashing materials for vulcanized EPDM or butyl roofing membranes contain a special vulcanizing system which allows the EPDM or butyl flashing to cure in-situ on the roof under ambient temperature conditions over a period of time. In time, the EPDM or butyl flashing will develop physical properties which are comparable to those of the vulcanized EPDM or butyl roofing membrane.

Vulcanizing systems for the EPDM or butyl flashing compositions herein may be readily obtained or developed by those skilled in the polymer vulcanization art without undue experimentation by judicious selection of vulcanizing agents and accelerators from the list of compounds set forth above. In general, such vulcanizing systems will contain sulfur, one or more sulfur donor compounds selected from the group consisting of thiuram polysulfides such as tetramethylthiuram disulfide, dipentamethylenethiuram hexasulfide, dipentamethylene thiuram tetrasulfide, dimethylmorpholino thiuram disulfide and the like; and dithiocarbomate compounds such as zinc diethyldithiocarbamate, tellurium diethyldithiocarbamate and the like; and a vulcanizing accelerator such as tetramethylthiuram monosulfide, 2-mercaptobenzothiazole, 2-(morpholinodithio)- benzothiazole disulfide and the like. Illustrative examples of suitable vulcanizing systems for EPDM or butyl roof flashing compositions are described in U.S. Pat. No. 4,461,875, the disclosure of which is incorporated herein by reference. As disclosed in the aforementioned patent, such vulcanizing systems contain sulfur on a sulfur donor curative and dipentamethylenethiuram hexasulfide and optionally one or more vulcanizing accelerators. Vulcanizable EPDM or butyl elastomers containing the above vulcanizing systems generally show good cure development in a 70° C. oven indicating their suitability for roof curing.

Vulcanizing agents which may be employed in neoprene elastomer compositions include among others, thiuram compounds such as tetramethylthiuram monosulfide, tetramethylthiuram disulfide, dipentamethylenethiuram tetrasulfide, dipentamethylenethiuram hexasulfide and the like; urea compounds such as 1,3-diethyl thiourea, 1,3-dibutyl thiourea, N,N'-diethyl thiourea, N,N'-dibutyl thiourea, trimethyl thiourea, ethylene thiourea and the like; guanidine compounds such as diphenyl guanidine, o-tolylbiguanidine, di-o-tolylguanidine and the like; dithiocarbamate compounds such as zinc diethyldithiocarbamate, zinc dibutyldithiocarbamate, tellurium diethyldithiocarbamate and the like; and benzothiazyl disulfide, 2,2'-dibenzothiazyl disulfide and the like. It should be appreciated that this list is not exclusive and other vulcanizing agents known in the art to be effective in the curing of neoprene elastomers may also be utilized.

Vulcanizing agents which may be employed in chlorosulfonated polyethylene elastomer composition include N,N'-m-phenylenedimaleimide and thiuram compounds such as tetramethylthiuram monosulfide, tetramethylthiuram disulfide, dipentamethylenethiuram tetrasulfide, dipentamethylenethiuram hexasulfide and the like.

Vulcanizing agents which may be employed in chlorinated polyethlene elastomer compositions include organic peroxides such as n-butyl-4,4-bis (tertiarybutyl-peroxy) valerate (40% active) on $CaCO_3$, tertiary butyl perbenzoate (40% active) on $CaCO_3$ and the like. It is often desirable and preferred to employ a coagent with the organic peroxide. Suitable coagents include triallyl isocyanurate, triallyl trimellitate, diallylphthalate and the like. If desired, the chlorinated polyethylenes can also be radiation cured in known manner using radiation crosslinking additives of the acrylate and methacrylate types such as allyl acrylate, allyl methacrylate, diallyl fumarate, triethylglycoldimethacrylate, ethyleneglycol dimethacrylate, cyclohexyl methacrylate and the like.

Amounts of vulcanizing agents employed in the vulcanizable elastomeric roof sheeting and flashing compositions of the invention may range from about 0.5 to about 6.0 parts by weight with preferred amounts ranging from 1.0 to 4.0 parts by weight.

The compositions of the invention may also contain other conventional rubber compounding and vulcanizing ingredients. Thus, the compositions may contain processing or softening oils which may be added as such or may be present from oil-extended rubbers, zinc oxide, stearic acid, sulfur, antioxidants, UV stabilizers, accelerators, cure retarders, processing aids, tackifying resins and the like. Other fillers such as silicates, talc, mica, calcium carbonate and the like may be used; typically conventional carbon black is employed.

The vulcanizable elastomeric composition used in the manufacture of roof sheeting or flashing may be prepared by mixing the ingredients of the composition in an internal mixer, for example, a Banbury mixer, an extruder and/or a two-roll mill. In the type B Banbury internal mixer, the dry or powdery materials are added rapidly followed by the addition of any liquids, e.g. process oils, plasticizers etc. and finally the elastomers. This type of mixing is often referred to as an upside-down mixing technique.

The roofing compositions may be prepared in sheet form in known manner by calendering or extrusion and then cutting the sheet to desired dimensions. The sheets may be cut for use as roof sheeting or flashing. Roof sheeting membrane and roof flashing are manufactured from rubber compounds and are typically evaulated for physical properties using test methods developed for mechanical rubber goods. Typical properties include tensile strength, modulus, ultimate elongation, tear resistance, ozone resistance, water absorption and hardness.

The following examples are submitted for the purpose of further illustrating the nature of the present invention and are not to be considered as a limitation on the scope thereof but are exemplary only. Parts and percentages shown in the examples are by weight, unless otherwise indicated and may be utilized within the amounts shown below as they would be compounded by one skilled in the art. EXAMPLES 1-5

These examples illustrated roof sheeting compositions of the invention which contain both metallurgical carbon and conventional carbon black. For comparative purposes, a composition containing only conventional carbon black is included as a control. The compositions had the following formulations:

| Ingredients | Example No. | | | | | |
|---|---|---|---|---|---|---|
| | Control | 1 | 2 | 3 | 4 | 5 |
| Royalene 2859[1] | 50 | 50 | 50 | 50 | 50 | 50 |
| Royalene 512[2] | 50 | 50 | 50 | 50 | 50 | 50 |
| HiStr GPF black[3] | 133 | 128 | 123 | 118 | 113 | 108 |
| "C" grade carbon[4] | — | 6.25 | 12.5 | 18.75 | 25 | 31.25 |
| Sunpar 2280 oil[5] | 80 | 80 | 80 | 80 | 80 | 80 |
| Zinc oxide | 5 | 5 | 5 | 5 | 5 | 5 |
| Stearic acid | 1 | 1 | 1 | 1 | 1 | 1 |
| Sulfur | 1 | 1 | 1 | 1 | 1 | 1 |
| TMTDS[6] | 0.9 | 0.9 | 0.9 | 0.9 | 0.9 | 0.9 |
| Santocure NS[7] | 2.2 | 2.2 | 2.2 | 2.2 | 2.2 | 2.2 |
| Total | 323.1 | 324.35 | 325.6 | 326.85 | 328.1 | 329.35 |

[1]An EPDM terpolymer containing 56.5% ethylene, 39.4% propylene and 4.1% 5-ethylidene-2-norbornene, having a Mooney Viscosity (ML 1 plus 4) at 125° C. of 52 available from Uniroyal, Inc.
[2]An EPDM terpolymer containing 49.9% ethylene, 48.0% propylene and 2.1% 5-ethylidene-2-norbornene, having a Mooney Viscosity (ML 1 plus 4) at 125° C. of about 53 available from Uniroyal, Inc.
[3]High structure general purpose furnace carbon black
[4]Metallurgical carbon, defined above
[5]Paraffinic process oil
[6]tetramethylthiuram disulfide
[7]N—tert-butyl benzothiazole-2-sulfenamide The above EPDM formulations were prepared by first adding the powdery fillers, zinc oxide, stearic acid, process oils and finally the EPDM terpolymer to a laboratory B type Banbury internal mixer. The batches were dumped at a temperature of about 275° F. Then, the rubber masterbatch was mill mixed with the cure package, i.e., sulfur, TMTDS and Santocure NS. The temperature of the mill mixed stock was not allowed to exceed 190° F. The cure package was kept constant in all of the compositions shown in Table I.

The resultant compounds were tested for unaged and aged stress-strain properties, unaged and aged die C tear resistance, green stock viscosity, scorch time, cure rate, hardness and green strength (GS) properties. Test conditions and results are shown in Tables I through III.

TABLE I

| | Example No. | | | | | |
|---|---|---|---|---|---|---|
| | Control | 1 | 2 | 3 | 4 | 5 |
| ML/4 at 212° F. | 51.4 | 51.7 | 48.2 | 46.3 | 47.6 | 44.5 |
| Monsanto Rheometer at 300° F. | | | | | | |
| Scorch time, min. | 14.3 | 14.4 | 14.6 | 14.7 | 14.6 | 15.3 |
| Time to 90% cure, min. | 29.5 | 31.2 | 32.1 | 33.0 | 31.3 | 32.6 |
| Min. torque, in.-lbs. | 6.5 | 6.0 | 5.4 | 5.8 | 5.7 | 5.6 |
| Torque at 90% cure, in.-lbs. | 27.2 | 27.2 | 26.1 | 26.5 | 26.6 | 26.0 |
| Max. torque, in.-lbs. | 29.5 | 29.5 | 28.4 | 28.8 | 28.9 | 28.3 |
| Cure Rate Index | 6.6 | 6.0 | 5.7 | 5.5 | 6.0 | 5.8 |
| Green Strength (GS) properties at 73° F. - 3 × 6 × 0.100 inch slabs - pressed 5' at 212° F. | | | | | | |
| Initial GS, psi | 55 | 50 | 55 | 50 | 55 | 52.5 |
| Peak GS, psi | 97 | 85 | 94 | 84 | 92.5 | 89 |
| GS at Break, psi | 76.5 | 67 | 80 | 74 | 80 | 78.5 |
| Elongation at break, % | 1085 | 1125 | 1120 | 1050 | 1100 | 1120 |

TABLE II

| | Example No. | | | | | |
|---|---|---|---|---|---|---|
| | Control | 1 | 2 | 3 | 4 | 5 |
| Unaged Stress-Strain Properties at 73° F. - slabs cured at 300° F. | | | | | | |
| 100% Modulus, psi | | | | | | |
| 23' | 350 | 350 | 320 | 300 | 300 | 290 |
| 30' | 400 | 410 | 360 | 340 | 375 | 375 |
| 200% Modulus, psi | | | | | | |
| 23' | 850 | 840 | 825 | 815 | 800 | 775 |
| 30' | 975 | 975 | 950 | 875 | 840 | 800 |
| 300% Modulus, psi | | | | | | |
| 23' | 1275 | 1260 | 1175 | 1150 | 1115 | 1085 |
| 30' | 1400 | 1400 | 1365 | 1350 | 1325 | 1295 |
| Tensile Strength, psi | | | | | | |
| 23' | 1700 | 1675 | 1660 | 1625 | 1615 | 1600 |
| 30' | 1825 | 1775 | 1775 | 1685 | 1650 | 1635 |
| Elongation at break, % | | | | | | |
| 23' | 460 | 455 | 465 | 470 | 475 | 475 |
| 30' | 425 | 425 | 435 | 440 | 450 | 455 |
| Aged Stress-Strain Properties at 73° F. - slabs cured 30' at 300° F. | | | | | | |
| Aged 7 days at 250° F. | | | | | | |
| 100% Modulus, psi | 775 | 800 | 775 | 750 | 735 | 700 |
| 200% Modulus, psi | 1775 | 1775 | 1725 | 1675 | 1650 | 1600 |
| Tensile at break, psi | 1975 | 1950 | 1950 | 1920 | 1895 | 1850 |
| Retention, % | 108.2 | 109.9 | 109.9 | 113.9 | 114.8 | 113.1 |
| Elongation at break, % | 225 | 225 | 230 | 235 | 240 | 245 |
| Retention, % | 52.9 | 52.9 | 52.9 | 53.4 | 53.3 | 53.8 |
| Aged 14 days at 250° F. | | | | | | |
| 100% Modulus, psi | 865 | 875 | 850 | 850 | 875 | 835 |
| 200% Modulus, psi | 1975 | 1950 | 1935 | 1925 | 1950 | 1925 |
| Tensile at break, psi | 1985 | 1970 | 1940 | 1910 | 1900 | 1890 |
| Retention, % | 108.8 | 110.9 | 109.3 | 113.4 | 115.2 | 115.6 |
| Elongation at break, % | 220 | 215 | 210 | 210 | 205 | 210 |
| Retention, % | 51.8 | 50.6 | 48.3 | 47.7 | 45.6 | 46.2 |

TABLE III

| | Example No. | | | | | |
|---|---|---|---|---|---|---|
| | Control | 1 | 2 | 3 | 4 | 5 |
| Crescent Tear* at 73° F. - Die B, 100 ga. slabs cured 35' at 300° F. | | | | | | |
| Unaged | | | | | | |
| lbs./inch | 258 | 238 | 257 | 260 | 235 | 232 |
| | 270 | 250 | 233 | 251 | 255 | 242 |
| avg. | 264 | 244 | 245 | 255.5 | 245 | 237 |
| Aged 7 days at 250° F. | | | | | | |
| lbs./inch | 190 | 177 | 191 | 211 | 193 | 208 |
| | 186 | 175 | 205 | 207 | 210 | 190 |
| avg. | 188 | 176 | 198 | 209 | 201.5 | 199 |
| Aged 14 days at 250° F. | | | | | | |
| lbs./inch | 188 | 192 | 185 | 192 | 179 | 168 |
| | 172 | 185 | 180 | 174 | 202 | 171 |
| avg. | 180 | 188.5 | 182.5 | 183 | 190.5 | 169.5 |
| Crescent Tear* at 180° F. - Die B, 100 ga. slabs cured 35' at 300° F. | | | | | | |
| Unaged | | | | | | |
| lbs./inch | 188 | 180 | 178 | 188 | 165 | 158 |
| | 162 | 200 | 160 | 184 | 156 | 166 |
| avg. | 175 | 190 | 169 | 186 | 160.5 | 162 |
| Aged 7 days at 250° F. | | | | | | |
| lbs./inch | 152 | 177 | 152 | 149 | 148 | 174 |
| | 158 | 156 | 151 | 153 | 140 | 148 |
| avg. | 155 | 166.5 | 151.5 | 151 | 144 | 161 |
| Aged 14 days at 250° F. | | | | | | |
| lbs./inch | 121 | 138 | 140 | 128 | 141 | 132 |
| | 137 | 113 | 150 | 143 | 133 | 126 |
| avg. | 129 | 125.5 | 145 | 135.5 | 137 | 129 |
| Shore "A" Hardness - compression set button - cured 35' at 300° F. | | | | | | |
| unaged tested at 73° F. | 64 | 64 | 63 | 63 | 64 | 64 |
| aged 7 days at 250° F.- tested at 73° F. | 71 | 71 | 69 | 70 | 71 | 70 |
| aged 14 days at 250° F.- tested at 73° F. | 72 | 71 | 70 | 70 | 71 | 71 |
| aged 30 days at 250° F.- tested at 73° F. | 74 | 74 | 73 | 72 | 73 | 72 |

*Tear test conducted in accordance with ASTM D624-81, Die B tear test

The resultant compounds of this invention find advantageous use for the manufacturing of roof sheeting and flashing compositions because of their lower Mooney (green stock viscosity) resulting in easier processing. These compounds with metallurgical carbon and conventional carbon black also exhibit directionally improved scorch safety and slightly slower curing than the control composition which contains only conventional carbon black. Also, green strength (GS) properties (i.e., peak GS, GS at break, elongation to break, etc.) and both unaged and aged stress-strain, die C tear and hardness data were virtually unaffected by replacing conventional carbon black with metallurgical carbon at a ratio of 1 phr to 1.25 phr. Oven aging is an accelerated heat aging test designed to determine the effect of heat on the thermal stability of the chemical crosslinks formed during the actual vulcanization process. The roof sheeting may be cured in an autoclave using either dry heat or steam, radiation cured, cured using microwave, and the like. Before curing, the surface of the roof sheeting is lightly dusted with talc or mica or an equivalent release agent in order to prevent sticking of the individual sheets during the vulcanization process. Since metallurgical carbon is commonly a waste product from the steel industry, the compositions of this invention are relatively inexpensive.

I claim:
1. A roof sheeting or flashing composition comprising:

(a) 100 parts by weight of a vulcanizable elastomer selected from the group consisting of EPDM, neoprene, chlorosulfonated polyethylene and chlorinated polyethylene;

(b) from about 6.0 to bout 55.0 parts by weight of a metallurgical carbon having a particle size distribution of 97% less than 5 microns, 50% less than 1.5 microns and 30% less than 1 micron; and (c) from about 0.5 to about 6.0 parts by weight of a vulcanizing agent.

2. The composition of claim 1 wherein said metallurgical carbon has a fixed carbon content of 75%, an ash content of 23%, a sulfur content of 1%, a moisture content of 1.25%, a specific gravity of 1.75 at 25° C. and a bulk density of 25 pounds per cubic foot.

3. The composition of claim 1 wherein said composition contains from about 6.0 to about 32.0 parts of metallurgical carbon.

4. The composition of claim 1 further comprising from about 78.0 to about 128.0 parts by weight of carbon black.

5. The composition of claim 1 wherein said vulcanizable elastomer is EPDM.

6. The composition of claim 5 wherein said vulcanizing agent is selected from the group consisting of sulfur, sulfur donor compounds and mixtures thereof.

7. The composition of claim 6 wherein said sulfur donor compound is selected from the group consisting of thiuram polysulfides, salts of dialkyldithiocarbamates and mixtures thereof.

8. The composition of claim 6 wherein said mixture of sulfur and sulfur donor compound is a mixture of sulfur and tetramethylthiuram disulfide.

9. The composition of claim 6 further comprising one or more vulcanizing accelerators.

10. The composition of claim 9 wherein said vulcanizing accelerator is selected from the group consisting of thioureas; thiuram monosulfides; benzothiazole sulfenamides; 2-mercaptoimidazoline; N,N'diphenyl guanidine; N,N'-di-(2-methylphenyl) guanidine; 2-mercaptobenzothiazole, zinc 2-mercaptobenzothiazole and 2-(morpholinodithio)-benzothiazole disulfide.

11. The composition of claim 1 further comprising processing oils, plasticizers, processing aids, antioxidants, UV stabilizers and tackifying resins.

12. The composition of claim 1 further comprising fillers selected from the group consisting of carbon black, silicates, talc, and calcium carbonate.

* * * * *